Jan. 5, 1965 H. S. HAWKINS 3,164,176
SAW GUIDE FOR BAND SAW MACHINES HAVING WORK GUIDE MEANS
Original Filed June 23, 1960 3 Sheets-Sheet 2
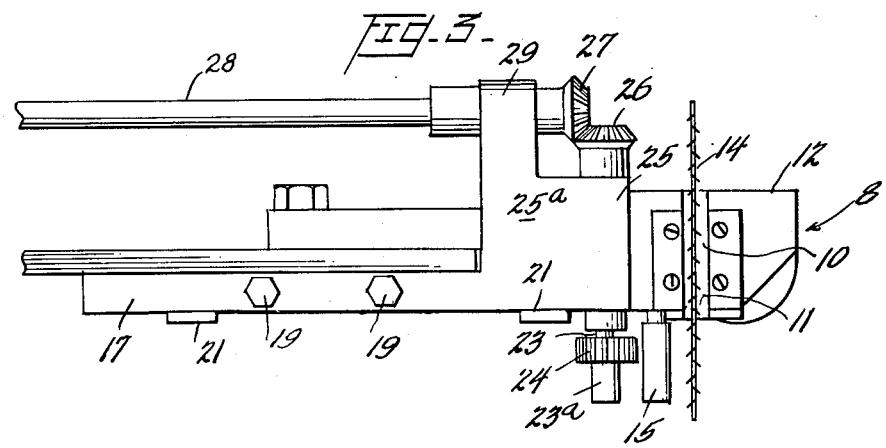
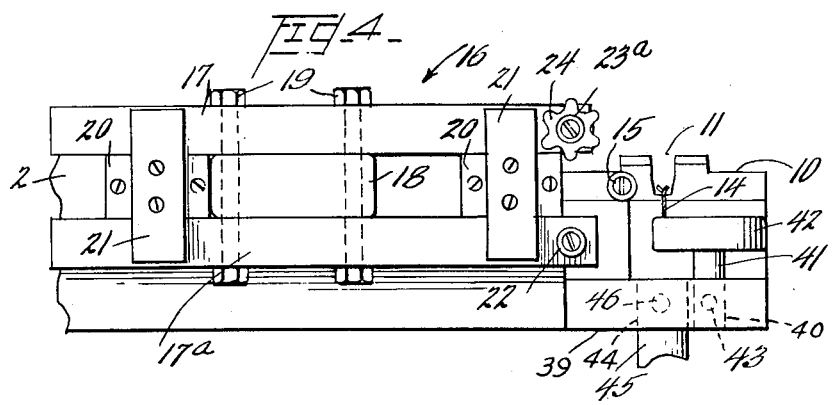
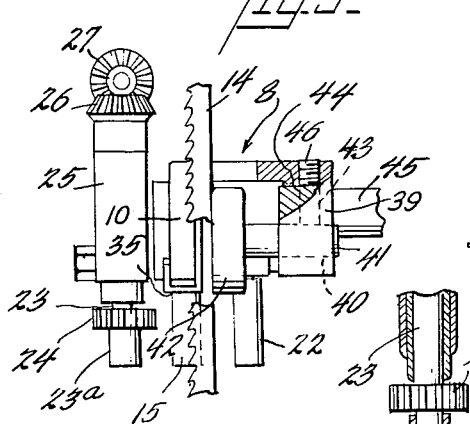
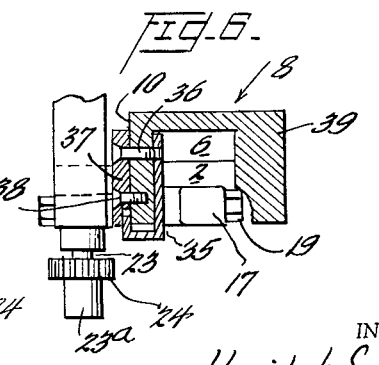
INVENTOR
Havilah S. Hawkins
BY
ATTORNEYS

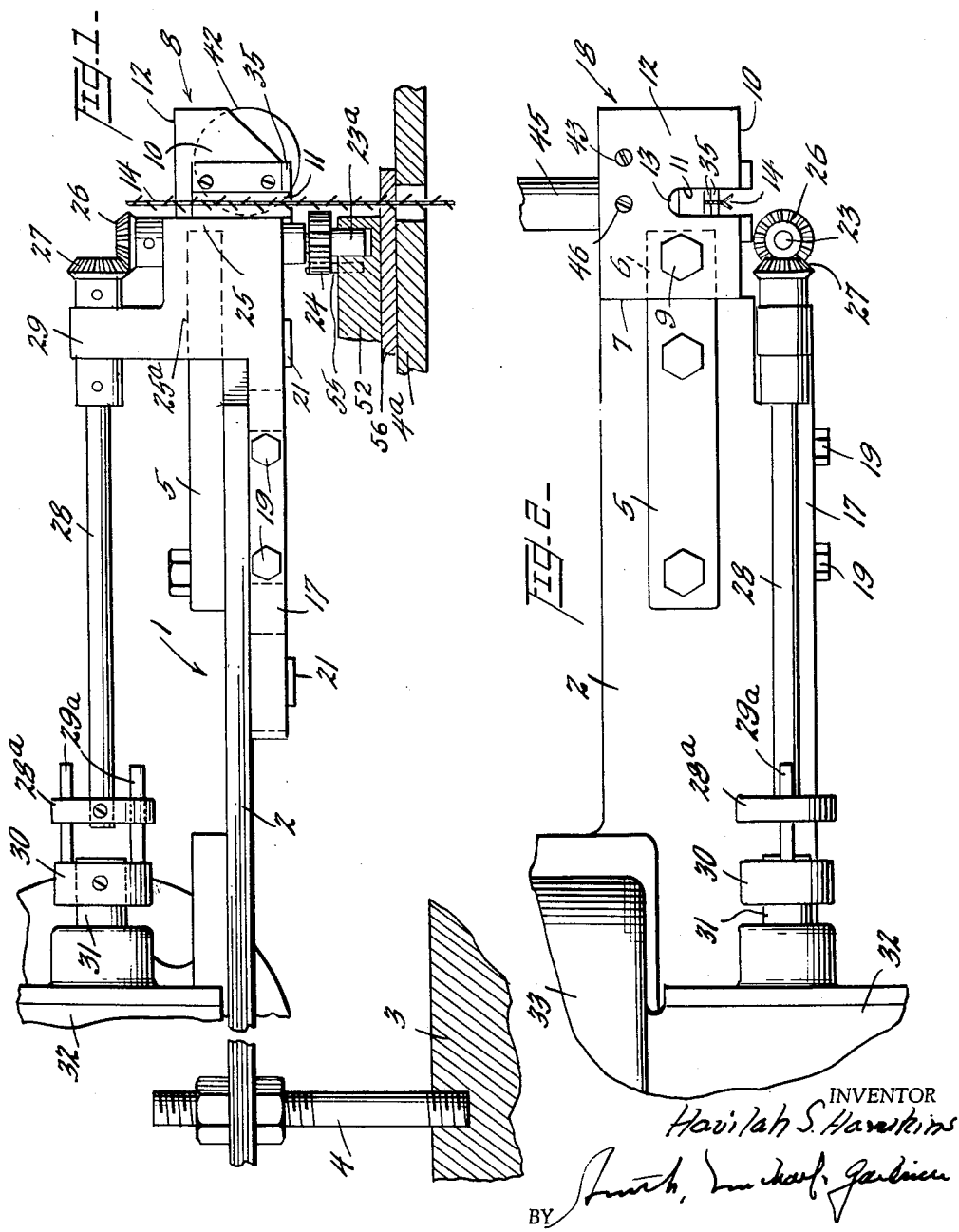

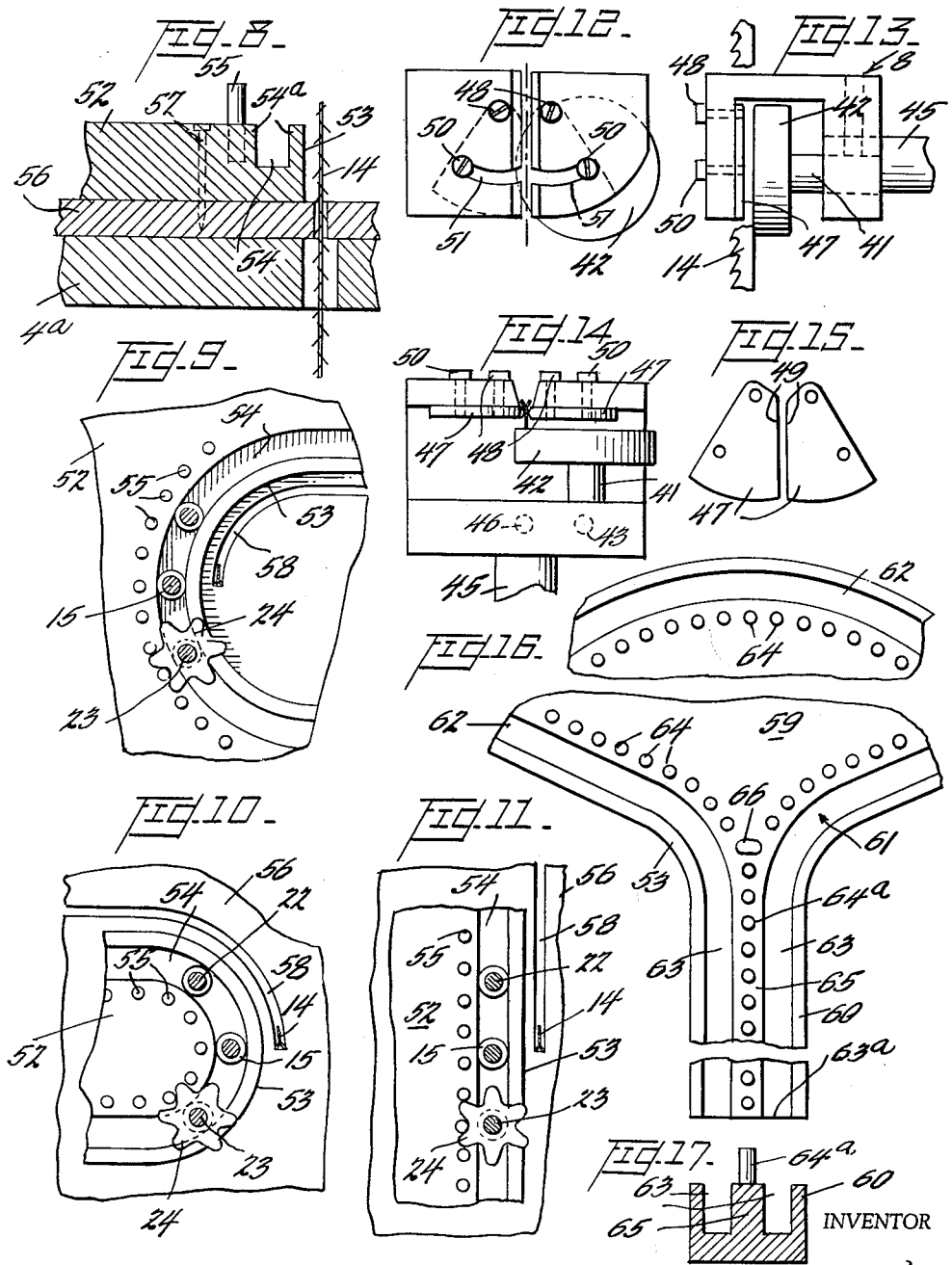

United States Patent Office 3,164,176
Patented Jan. 5, 1965

3,164,176
SAW GUIDE FOR BAND SAW MACHINES
HAVING WORK GUIDE MEANS
Havilah S. Hawkins, Sedgwick, Maine
Original application June 23, 1960, Ser. No. 38,280, now Patent No. 3,068,913, dated Dec. 18, 1962. Divided and this application June 1, 1962, Ser. No. 208,162
2 Claims. (Cl. 143—161)

This application is a division of my application Serial No. 38,280, filed June 23, 1960, for Work Feed Device For Band Saws, now Patent No. 3,068,913 granted December 18, 1962.

This invention is an attachment for band saw machines by which a work piece may automatically be fed to the saw and constitutes an improvement over the somewhat similar attachment described in my Patent No. 2,934,107 issued April 26, 1960.

The invention seeks to provide means whereby a work unit including a pattern member and a work piece may be automatically fed to the saw in a manner to reproduce in the work piece pattern profiles or contours present in the pattern member secured to the work piece.

The invention contemplates means for driving the work unit into the saw by means including sprocket teeth and gears cooperatively carried by the pattern piece and the attachment.

Furthermore, the invention contemplates a novel pattern member containing a contoured groove corresponding to the desired profile to be produced in a work piece to which the pattern member is secured, the pattern member carrying a series of sprocket teeth arranged along a root line duplicating the contours of the pattern groove.

The novel means embodied in the pattern member for driving and guiding the same is particularly applicable to a pattern for making game or table tennis paddles and the invention includes a pattern member designed particularly for producing paddles of this type.

The attachment also includes a saw guide block of novel design.

Other important features of the present invention will become apparent from the following specification when read in the light of the accompanying drawings wherein are illustrated preferred embodiments of the invention and wherein FIG. 1 is a fragmental side elevation partly in section of the invention, FIG. 2 is a fragmentary top plan view of the invention, FIG. 3 is a fragmental detailed view of the drive means for one of the guide rollers, FIG. 4 is a bottom plan view of the carriage which carries the movable guide rollers, FIG. 5 is a fragmental detailed view, partly in section showing the saw guide block and backing roller, FIG. 6 is a fragmental sectional view showing the interior of the saw guide block, FIG. 7 is a sectional detail showing the mounting for the drive sprocket, FIG. 8 is a sectional detail view showing the relative position of the pattern member, work piece and saw blade, FIGS. 9, 10 and 11 show fragmental detail views illustrating various positions of the movable and stationary guide rollers when traversing portions of the pattern groove having different curvature, FIGS. 12, 13, 14 and 15 are fragmental detail views showing a modified form of the saw guide, and FIGS. 16 and 17 show details of a pattern member designed for cutting table-tennis paddles.

Referring more particularly to the accompanying drawings wherein like reference numerals designate like parts throughout the invention comprises an attachment indicated generally at 1 for a band saw machine and includes a base member 2 designed to be secured to a fixed part 3 of the saw machine frame by a stud bolt 4 or any similar means. The base member 2 is in the form of an elongated plate which as shown is mounted in upwardly spaced generally parallel relation to the worktable 4a of the saw machine. On the upper surface of the base or plate member 2 is secured a supporting bar 5 the forward end 6 of which projects beyond the forward end 7 of the plate 2.

A saw blade guide block 8 is mounted on the free end 6 of the bar 5 and is secured thereto by bolt 9, the saw guide block 8, for this purpose, having an apertured side wall to permit entry of the end 6 of the bar 5.

The saw guide block 8 has a front wall 10, the latter being provided with a vertically disposed slot 11 extending throughout the vertical length thereof and penetrating the top face 12 of the block as shown at 13. As will hereinafter appear, the slot 11 receives the saw blade 14 of the saw machine and in effect, defines the path of movement of the saw blade.

The saw guide block 8 may conveniently be made from a section of inverted U-shape channel stock and thus is open at the sides and the bottom thereof as shown in the drawings. A fixed work guide member 15 is mounted on the lower edge of the slotted side wall 10 of the block and depends from the guide block so that the vertical axis thereof is substantially aligned with the vertical cutting edge of the saw and lies in a vertical plane passing through the cutting edge of the saw and substantially perpendicular to the plane of the saw. If desired, the fixed work guide member 15 may carry a roller sleeve freely rotatable about the axis thereof.

A carriage member indicated generally at 16 is mounted on the underside of the supporting base or plate 2 as shown most clearly in FIG. 4. The carriage member comprises a pair of spaced bars 17–17a secured on opposite sides of a spacing block 18 by screw bolts 19. The carriage 16 is designed to move longitudinally of the base member 2 towards and from the saw 14 and for guiding it in its movement there are provided a pair of guide blocks 20—20 secured to the underface of the base or support 2, said guide blocks being straddled by the bars 17–17a of the carriage. The guide blocks 20 each carry a transverse strip 21 which projects beyond the block and overlies the bars 17 of the carriage so that the carriage is retained in operative relation with the base 2 and has limited sliding motion in respect to the base.

The forward end of the carriage adjacent the saw blade 14 is provided with a pair of depending work guide shafts 22 and 23, disposed equal distances on opposite sides of a vertical plane passing perpendicularly through the plane of movement of the saw blade. The shafts 22 and 23 may conveniently be secured to and depend from underfaces of the bars 17–17a, respectively as shown. The shafts 22 and 23 have their axes in a common vertical plane parallel to the plane of movement of the saw blade as defined by the slot 11 in the guide block 8.

The shaft 23 carries a rotatable sleeve roller 23a at its lower end, the sleeve being secured upon but freely rotatable on the shaft by a screw member as shown in FIG. 7. A similar roller sleeve may be similarly mounted on the work guide shaft 22 if desired. A sprocket gear 24 is secured to the shaft 23 to rotate therewith, as shown, and the shaft is extended above the plane of the base member 2 and mounted for rotation about a vertical axis by journal means indicated generally at 25. The journal 25 is carried by a wingplate 25a carried by the forward end of the carriage bar 17. The upper end of the shaft 23 carries a beveled gear 26 which meshes with a second beveled gear 27, the latter gear being mounted on the forward end of a shaft 28 mounted for rotation in journal means 29 carried by the wingplate 25a as clearly shown in FIG. 1. The shaft 28 extends longitudinally of the base 2 in general parallelism therewith as shown and carries at its end remote from the gear 27 an apertured collar 28a. Drive pins 29—29 are engaged in the apertures within the plate 28 and the pins 29 are fixedly secured to a collar 30 which in turn is secured to a driving shaft 31 protruding from a gear box 32 mounted on the base 2 as shown. Operatively associated with the gear box 32 is a motor 33 for driving the same. The journal means 25 and 29 being carried by the wingplate member 25a which in turn is carried by carriage 16 causes the shaft 28 to move to and from the plane of the saw along with the carriage 16. To this end the collar 30 and the pins 29a in association with the apertured plate 28 form a slip drive connection between the shaft 31 and the shaft 28 to provide drive for the gear 24 in all positions of the carriage 16.

The saw guide block 8 is provided with means for maintaining the saw blade 14 within a desired path of movement and to this end there is provided a pair of guide plates 35 which are mounted within the guide block on the inner face of the slotted wall 10 thereof and on opposite sides of the slot 11. In one form of the invention the guide plates 35 are substantially J-shaped as shown in FIG. 6 and the long end of the J is disposed on the inner face of the slotted wall 10 of the guide block and secured thereto by a screw member 36 passing through a clamping plate 37 overlying the front face of the wall 10 as clearly shown in FIG. 6. The short end of the J-shaped plates 35 overlie the front face of the wall 10 with the hook portion of the J-shaped guide plates embracing the lower edge of the front wall 10. The clamping plate 37 is relieved or cut away at its lower edge as shown in FIG. 6 to provide a recess within which the terminal portion of the J-shaped plate is received. Thus, the J-shaped guide plates 35 may be adjustably mounted towards and away from each other across the slot 11 by pivotal movement about the respective screw members 36 and then clamped in a desired position of adjustment by clamping screw 38 passed through the lower portion of the clamping plate 37 in the region of the upturned end portion of the J-shaped guide plate. The screw members 36 are also tightened. This construction is clearly shown in FIG. 6.

The rear wall 39 of the saw guide block 8 is provided with an aperture 40 to receive a stud shaft 41 which extends within the hollow interior of the saw guide block and carries at its inner end a saw-blade back-up roller 42. The shaft 41 may be secured in any position of longitudinal adjustment by a set screw 43. The function of the back-up roller 42 is to prevent deformation of the saw blade rearwardly, when in use. The design of the saw guide block 8 and the guide plates 35 as described permits the back-up roller 42 to be disposed close to that portion of the saw which is engaged with the work, therefore, more effectively to perform its function in precluding rearward deformation of the saw blade in use.

The rear wall 39 of the saw guide block 8 is also provided with an aperture 44 designed to receive and support a rearwardly projecting stud 45 by which the saw guide block in particular, and the attachment as a whole may be secured to a fixed part of the saw machine frame to thereby more rigidly support the same. The stud 45 may be secured in any desired longitudinally adjusted position by a set screw 46.

The invention also contemplates a modified form of saw guide block such as shown in FIGS. 12, 13, 14 and 15. In this form the guide block body is generally similar to that previously described but a different type of guide plate is associated with the slotted front wall of the block, to define the path of movement of the saw blade. Thus, in FIG. 12, the guide plates 47 for the saw block are generally wing-shaped (see FIG. 15), and are mounted on the inner face of the slotted front wall of the guide block by supporting screw members 48, the plates 47 depending from the screws 48 and having pivotal movement with respect thereto. The guide plates 47 are provided with generally straight edge portions 49 which are designed to lie on opposite sides of the saw receiving slot in the guide block and to be adjusted laterally of said slot about the pivot screws 48. Each of the plates 47 may be secured in any desired position of adjustment by a second screw 50 carried by each plate and positioned thereon to traverse an arcuate slot 51 provided in the slotted front wall of the guide block, as shown in FIG. 12. The screws 50 at their inner ends are screw threadedly attached to the respective plates 47 as shown so that when the plates are properly adjusted, the screws 48 and 50 may be tightened to secure the plates in adjusted position. The guide block in this modification is similarly provided with a saw back-up roller and supporting stud as shown, similar in all respects to these elements as described in connection with the first form of guide block.

As previously stated, the invention contemplates the automatic feeding of a work unit to the saw blade of the machine with which the attachment is associated. To this end the work unit comprises a pattern member 52 which may be in the form of a plate-like member of metal, wood or any suitable material, and having an edge portion 53 contoured in accordance with a predetermined pattern to be reproduced in a work piece associated with the pattern member, in a manner to be described. The pattern member 52 adjacent to its contoured edge 53 is provided with a contoured groove 54 which duplicates the undulations of the contoured edge 53 of the pattern member. The groove 54 is preferably provided with substantially straight vertically disposed side walls 54a and opens up through the top surface of the pattern member. Adjacent to the groove 54 is a series of upstanding sprocket teeth 55 carried by the pattern member, said teeth being preferably in the form of upright generally cylindrical pin-like members arranged along a root line duplicating in every respect the undulations of the groove 54 and the contoured edge 53 of the pattern. The pins 55 may be operatively mounted in relation to either the inner or the outer wall of the groove 54 but it is preferred to dispose the teeth with respect to the groove so as to take advantage, wherever possible, of the inherent difference in speed of travel of the saw blade in its kerf and the rollers within the pattern groove, having in mind the difference in length of the arc to be traveled, depending upon whether the saw is traveling on the inside or the outside of an arc of curvature, and thus reduce the speed of travel of the saw on sharp curves.

The pattern member 52 may be secured to a work piece 56 in any preferred manner such as by nails or screws 57. The work unit comprising the pattern member 52 and the work piece 56 is supported upon the worktable 4a of the sawing machine to which the attachment is connected with the fixed roller 15 and the rollers 22 and 23a carried by the carriage 16 disposed within the groove 54 of the pattern member, and the sprocket gear 24 engaged with the teeth 55 of the pattern member as shown in FIGS. 1, 9, 10 and 11. It will be understood that in view of the fact that the roller 15 is in fixed relation to the path of movement of the saw blade, this roller acts as a pivot point for the work unit as the latter is driven into the saw by the sprocket and gear connection between the pattern piece 52 and the drive sprocket 24. As the sprocket 24 drives the pin teeth 55 of the pattern member, the work unit comprising the pattern member and the work piece is moved into the saw with the rollers traversing the groove 54 and the work unit moves about on the worktable, swinging about the stationary roller 15 as a pivot. In this manner the saw blade 14 will cut a kerf in the work piece 58 which follows exactly the undulations or curvatures in the profile edge of the pattern member 52.

The novel features of the pattern member as described may conveniently be adapted to the manufacture of game paddles such as table tennis paddles. To this end there is shown in FIGS. 16 and 17 a specific form of this adaptation where the pattern member comprises a portion 59 corresponding to the striking surface of a game paddle and a portion 60 corresponding to the handle of a game paddle. The roller receiving groove of the pattern member is shown generally at 61 and includes a loop portion 62 which circumscribes the striking area of the pattern member and a pair of straight groove portions 63—63 in the handle portion of the pattern member. It will be understood, of course, that the straight portions 63 of the handle portion of the pattern member and the loop or curved portion 62 of the pattern member are continuous and circumscribe the contoured edge of the entire pattern member. The pattern member adjacent the inner wall of the groove thereof carries a series of upstanding pin-like sprocket teeth 64 which are disposed on a root line which corresponds to and duplicates all of the contours of the pattern groove. It is to be noted that the handle portion of the paddle pattern has a web portion 65 disposed intermediate the two straight groove portions 63—63 and the upper edge of this web portion 65 carries a single row of sprocket teeth 64a which serve both the initial and terminal portions of the pattern groove. The single line of teeth 64a in the handle portion of the paddle pattern is joined to the teeth 64 which circumscribe the striking area of the pattern in a generally Y-shaped formation, with a single generally oval shaped tooth 66 positioned at the base or apex of the Y formation and this single tooth functions to carry the sprocket gear 24 from the teeth 64a of the handle portion of the pattern to the teeth 62 on the curved portion of the pattern and then return it to the teeth 64a. As shown, the straight portions 63 of the groove extend out through the end of the pattern member at 63a and thus permit the rollers 15, 23a and 22 to be entered into the groove at the beginning of a cutting operation and to emerge therefrom when the pattern member has been completely traversed by the saw blade.

In view of the foregoing it is apparent that the attachment of the present invention provides means for driving or moving a work unit including a pattern member and a work piece into the cutting edge of a band saw in a manner automatically to reproduce in the work piece the profile contours of the pattern member. Furthermore, the attachment includes a novel form of saw guide means by which the saw blade, in operation, is maintained in a desired path of movement and is constrained against undesirable flexure or deformation, either laterally of the plane of the saw or rearwardly within the plane of the saw.

Furthermore, the pattern member is designed so that the guide rollers may be entered within the groove of the pattern member through an opening in the wall of such groove. The opening may be conveniently disposed at an end of the groove as shown or elsewhere. This design feature avoids the necessity of relative vertical movement of the work unit and guide rollers to dispose the rollers in the groove in all applications where the shape of the pattern permits the use of an opening in the groove wall. Furthermore, the design feature of mounting the guide rollers on the carriage which moves to and from the plane of the saw and arranged to traverse a groove in the pattern precludes the necessity of spring-biased rollers for driving the pattern member.

It will be understood, of course, by those skilled in the art to which the present invention relates that the illustrated embodiments of the invention are but for the purpose of example only and that various changes in size, and proportion of parts may be made within departing from the spirit of the invention as set forth more completely in the appended claims.

I claim:

1. A saw guide for band saws comprising a body member of generally inverted U-shaped, having front and rear spaced depending wall members providing an open ended passageway therebetween, said body member being adapted to be mounted on a saw machine with said open ended passage extending perpendicularly to the plane of the saw and aligned with path of movement of a carriage mounted on the machine for reciprocation transversely of the plane of the saw and carrying work engaging guide rollers movable in paths transversely of the plane of the saw blade and spaced fore and aft with respect to the front wall of the body member whereby the carriage may move transversely of the plane of the saw blade to dispose spaced guide rollers carried thereby in fore and aft relation to said saw blade, a saw blade receiving slot opening through the front wall thereof and through the bottom edge of said wall, a saw blade guide member pivotally mounted on the slotted wall of the body member at each side of the slot and providing saw blade engaging surfaces at the opposite edges of the slot, said guide members being generally J-shaped in longitudinal cross section and having lower hooked ends, said guide members being positioned with the lower hooked ends thereof embracing the lower edge of the slotted front wall of the hollow member, one of said J-shaped members being positioned on each side of the slot respectively with the long leg of the J disposed inside of the body member and the short leg thereof being disposed on the outer face of said body member, and a pair of clamping plates secured to the outside surface of the slotted face of the body member and respectively overlying the short legs of the J-shaped guides, means for clamping the guide members between the clamping plate and the front wall of the body member to secure the guide members in adjusted position, and means for mounting the saw guide on a band saw machine.

2. The saw guide described in claim 1 wherein the rear wall of the body member opposite the slotted front wall thereof is provided with a mounting aperture for a stud shaft, a shaft mounted in said aperture, a saw blade back-up roller mounted on said shaft within the body member for rotation about an axis generally perpendicular to the plane of said apertured wall, and means for adjustably positioning the shaft axially thereof within said body member to dispose the back-up roller in proximity to the path of movement of the rear edge of the saw blade and in proximity to the saw blade guide members.

References Cited by the Examiner
UNITED STATES PATENTS

| | | | |
|---|---|---|---|
| 496,178 | 4/93 | Wright | 143—161 |
| 535,383 | 3/95 | Long | 143—162 |
| 758,619 | 5/04 | Culpepper | 143—162 |
| 2,542,524 | 2/51 | Hobbs | 143—167 |
| 2,754,858 | 7/56 | Davis | 143—171 |
| 2,765,008 | 10/56 | Hawkins | 143—167 |
| 2,827,085 | 3/58 | Ocenasek | 143—159.2 |
| 2,934,107 | 4/60 | Hawkins | 143—171 |
| 3,068,913 | 12/62 | Hawkins | 143—160 X |

FOREIGN PATENTS

| | | |
|---|---|---|
| 5,313 of 1901 | 3/01 | Great Britain. |

LESTER M. SWINGLE, *Primary Examiner.*

EARL EMSHWILLER, WILLIAM W. DYER, JR.,
*Examiners.*